US009328752B2

(12) United States Patent
Emanuel

(10) Patent No.: US 9,328,752 B2
(45) Date of Patent: May 3, 2016

(54) RAIL CLIP FOR FORMING DOOR AND WINDOW ASSEMBLIES

(71) Applicant: James Hardie Technology Limited, Dublin (IE)

(72) Inventor: Brian A. Emanuel, Baraboo, WI (US)

(73) Assignee: James Hardie Technology Limited, Dublin (IE)

( * ) Notice: Subject to any disclaimer, the term of this patent is extended or adjusted under 35 U.S.C. 154(b) by 319 days.

(21) Appl. No.: 13/771,644

(22) Filed: Feb. 20, 2013

(65) Prior Publication Data

US 2013/0219689 A1  Aug. 29, 2013

Related U.S. Application Data

(60) Provisional application No. 61/603,537, filed on Feb. 27, 2012.

(51) Int. Cl.
*F16B 2/20* (2006.01)
*E06B 1/52* (2006.01)
*E06B 3/964* (2006.01)

(52) U.S. Cl.
CPC . *F16B 2/20* (2013.01); *E06B 1/524* (2013.01); *E06B 3/9642* (2013.01); *Y10T 29/49947* (2015.01); *Y10T 403/42* (2015.01)

(58) Field of Classification Search
CPC .......... F16B 2/20; F16B 7/044; F16B 7/0446; E06B 3/964; E06B 3/9642; E06B 3/9687; E04B 2/766; E04B 2/767; E04H 2017/1452; E04H 2017/1465; E04H 2017/1469; A47B 47/0016; A47B 47/005; A47B 47/028; A47B 47/03; A47B 57/16; A47B 57/20; A47B 57/26; A47B 57/265; A47B 57/32; A47B 57/24; A47B 57/44; A47B 57/48; A47B 57/482; A47B 57/485; A47B 57/54
See application file for complete search history.

(56) References Cited

U.S. PATENT DOCUMENTS

| | | | | |
|---|---|---|---|---|
| 2,700,441 | A | * | 1/1955 | Cudini ............................. 52/214 |
| 3,129,965 | A | * | 4/1964 | Stark .............................. 403/217 |
| 3,566,561 | A | * | 3/1971 | Tozer .......................... 52/127.12 |
| 3,574,367 | A | * | 4/1971 | Jankowski ........... B62D 33/044 |
| | | | | 403/201 |
| 3,592,493 | A | * | 7/1971 | Goose ........................... 403/247 |
| 3,750,337 | A | | 8/1973 | Brydolf et al. |

(Continued)

FOREIGN PATENT DOCUMENTS

| | | | |
|---|---|---|---|
| CH | 584820 | * | 2/1977 |
| DE | 4135674 C1 | * | 4/1993 |

(Continued)

*Primary Examiner* — Gregory Binda
*Assistant Examiner* — Jonathan Masinick
(74) *Attorney, Agent, or Firm* — Boyle Fredrickson, S.C.

(57) ABSTRACT

A structural connection arrangement and method for connecting at least two sash, stile, mullion, or frame members of window and/or door frame assemblies that are oriented in crossing orientations when connected to one another. The connection arrangement includes at least two elongate members that each extend along a respective longitudinal axis. A pair of openings are formed in one of the elongate members and oriented to face in a crossing direction relative to the longitudinal axis of the respective member. A pair of connection members is secured to the other of the elongate members of the frame assembly and extends beyond the elongate member so that each connection member cooperates with one of the pair of openings and overlaps an interface between the two elongate members.

11 Claims, 5 Drawing Sheets

(56) References Cited

U.S. PATENT DOCUMENTS

| | | | |
|---|---|---|---|
| 4,015,367 A | | 4/1977 | DeBruyn |
| 4,104,000 A | * | 8/1978 | Fleischmann ....... E04F 11/1812 256/65.14 |
| 4,850,145 A | | 7/1989 | McAfee |
| 4,901,475 A | | 2/1990 | Simpson |
| 4,907,388 A | * | 3/1990 | Siahatgar ................ E04B 2/744 403/252 |
| 5,083,409 A | | 1/1992 | Pliml |
| 5,115,596 A | | 5/1992 | Fevold et al. |
| 5,350,156 A | * | 9/1994 | Cote et al. ................... 256/65.08 |
| 5,461,837 A | | 10/1995 | Chaney et al. |
| 5,499,667 A | * | 3/1996 | Nakanishi ..................... 144/365 |
| 5,579,621 A | * | 12/1996 | Fang ............................ 52/483.1 |
| 5,636,934 A | * | 6/1997 | Nakanishi et al. ............. 403/230 |
| 5,655,348 A | | 8/1997 | Paradise |
| 5,657,604 A | * | 8/1997 | Malott ................. F16B 7/0473 403/252 |
| 6,067,760 A | | 5/2000 | Nowell |
| 6,305,671 B1 | * | 10/2001 | Valentine ............ E04H 17/1443 256/65.13 |
| 6,434,789 B1 | | 8/2002 | Kruse |
| 6,481,177 B1 | * | 11/2002 | Wood ........................... 52/656.9 |
| 6,694,700 B1 | | 2/2004 | Mackett |
| 6,826,871 B2 | | 12/2004 | Morton et al. |
| 7,043,884 B2 | | 5/2006 | Moreno |
| 7,578,110 B2 | * | 8/2009 | Jenkins ..................... E04B 1/24 52/481.2 |
| 7,698,871 B2 | | 4/2010 | Mansueto et al. |
| 7,748,194 B2 | | 7/2010 | Carless |
| 7,784,239 B2 | | 8/2010 | Mansueto et al. |
| 7,845,139 B1 | | 12/2010 | Mansueto et al. |
| 2006/0026914 A1 | | 2/2006 | Schultz |
| 2007/0144106 A1 | | 6/2007 | Kirk et al. |
| 2008/0216424 A1 | | 9/2008 | Westphal et al. |
| 2009/0293387 A1 | | 12/2009 | Miethe et al. |
| 2010/0108969 A1 | * | 5/2010 | Platt .......................... 256/65.04 |
| 2011/0138589 A1 | | 6/2011 | Liang et al. |
| 2014/0075871 A1 | * | 3/2014 | Haan et al. ................... 52/309.1 |

FOREIGN PATENT DOCUMENTS

| | | | |
|---|---|---|---|
| DE | 4210456 A1 | * | 10/1993 |
| DE | 9415356 | * | 11/1994 |
| DE | 9413839 | * | 3/1995 |
| DE | 29508686 U1 | * | 9/1996 |
| EP | 1154167 A1 | * | 11/2001 |
| FR | 2330898 | * | 6/1977 |

* cited by examiner

RAIL CLIP FOR FORMING DOOR AND WINDOW ASSEMBLIES

CROSS-REFERENCE TO RELATED APPLICATIONS

This application claims priority to U.S. Provisional Patent Application Ser. No. 61/603,537, filed on Feb. 27, 2012, titled "Rail Clip" and the entire contents of which are expressly incorporated herein.

BACKGROUND AND SUMMARY OF THE INVENTION

This invention relates to a rail clip assembly, and more particularly, to a rail clip assembly for connecting rails, stiles, sash, mullion, or other elongate frame elements of windows and/or doors together.

Window and door sash and frame assemblies are commonly formed by connecting a number of elongate members to one another in a desired orientation to achieve a desired size and shape intended to cooperate with a structural frame opening. Window and door frame assemblies also frequently include window openings that can include one or more panes or lights that can be divided by one or more rails, stiles, or mullions. Typically, the corner connections of such structures are formed as mitered corners that facilitate the connection of the respective elongate members so that the cross-sectional areas of the elongate members engage one another in a common plane. Connections formed at intermediate locations along the longitudinal length of an elongate member, or connections associated with elongated members having smaller cross-sectional areas, do not commonly lend themselves to such mitered connections.

Typically, with elongate members having larger cross-sectional areas, a key passage is provided in the form of an enclosed passage located within an inner area of one of the connected frame or elongate members. The key passage is defined by a series of walls, which are typically integrally formed with each other and with the remaining structure of the frame member, such as in an extrusion or pultrusion process. The formation of such connections can substantially increase the manufacturing and assembly processes associated with forming such connections and limits the applicability of the respective elongate members to any application aside from those for which is specifically configured. Such a connection is also ill-suited for forming the connection between elongate members having smaller cross-sectional areas such as the mullions associated with forming divided lights.

Forming mitered connections along the longitudinal length of elongate members also suffers from various drawbacks. Typically, forming a mitered connection between elongate members requires greater preparation of a connection interface to ensure a tight finish joint interface between the connected members. Such connection methodologies also present the potential for reducing the structural integrity of the elongate members that have a reduced cross-sectional shape at an intermediate location to cooperate with a terminal end of a transversely oriented connecting member. The present invention seeks to provide a connection methodology that allows crossing elongate members of window and door frame assemblies to be quickly, conveniently and securely connected to one another in a manner that prevents translation of the members relative to one another after the members have been connected.

The present invention contemplates a structural connection arrangement and method of assembling a structural frame assembly. The structural connection arrangement includes a first member and a second member that each has a respective longitudinal axis. At least one opening is formed in one of the members and is oriented in a transverse or crossing direction relative to the respective longitudinal axis. The arrangement includes a pair of connection members for securing the first and second members together. Each connection member includes a first portion that is configured to be coupled to one of the first and second frame members and a second portion that extends beyond an end of the frame member to which it is connected. A tab is formed at an end of the second portion of each connection member and extends in an outward direction that is transverse to a longitudinal axis of the respective connection member. The opening formed in the other of the first and second frame members is shaped to cooperate with the second portion of a respective connection member so that, when the longitudinal axis of the first member is oriented in a transverse orientation relative to the longitudinal axis of the second member, and the connection member is advanced into engagement with the first and second members, the tab moves into alignment and passes through the opening and engages a surface of the second member that is adjacent the opening and faces away from the first member, thereby preventing movement of the second member away from the first member such that the first frame member and second frame member are secured to one another and oriented in transverse directions with respect to the longitudinal axes of the frame members.

The invention also contemplates a method of assembling a structural frame assembly, which involves providing a first elongate rail and a second elongate rail that are connectable to each other so that the first elongate rail and the second elongate rail extend in transverse or crossing directions relative to one another. A first rail clip and a second rail clip are provided, and each cooperates with the first elongate rail and the second elongate rail to extend across an interface between the connected rails. Each rail clip has a first portion that is constructed to engage a common end of the first elongate rail. A second portion of each rail clip cooperates with a respective opening formed in the second elongate rail so that a tab associated with the second portion of each rail clip overlaps a portion of the second elongate rail when the first elongate rail and the second elongate rail are secured to one another.

Various other features, aspects, and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF PARTICULAR EMBODIMENTS

Figure 1:
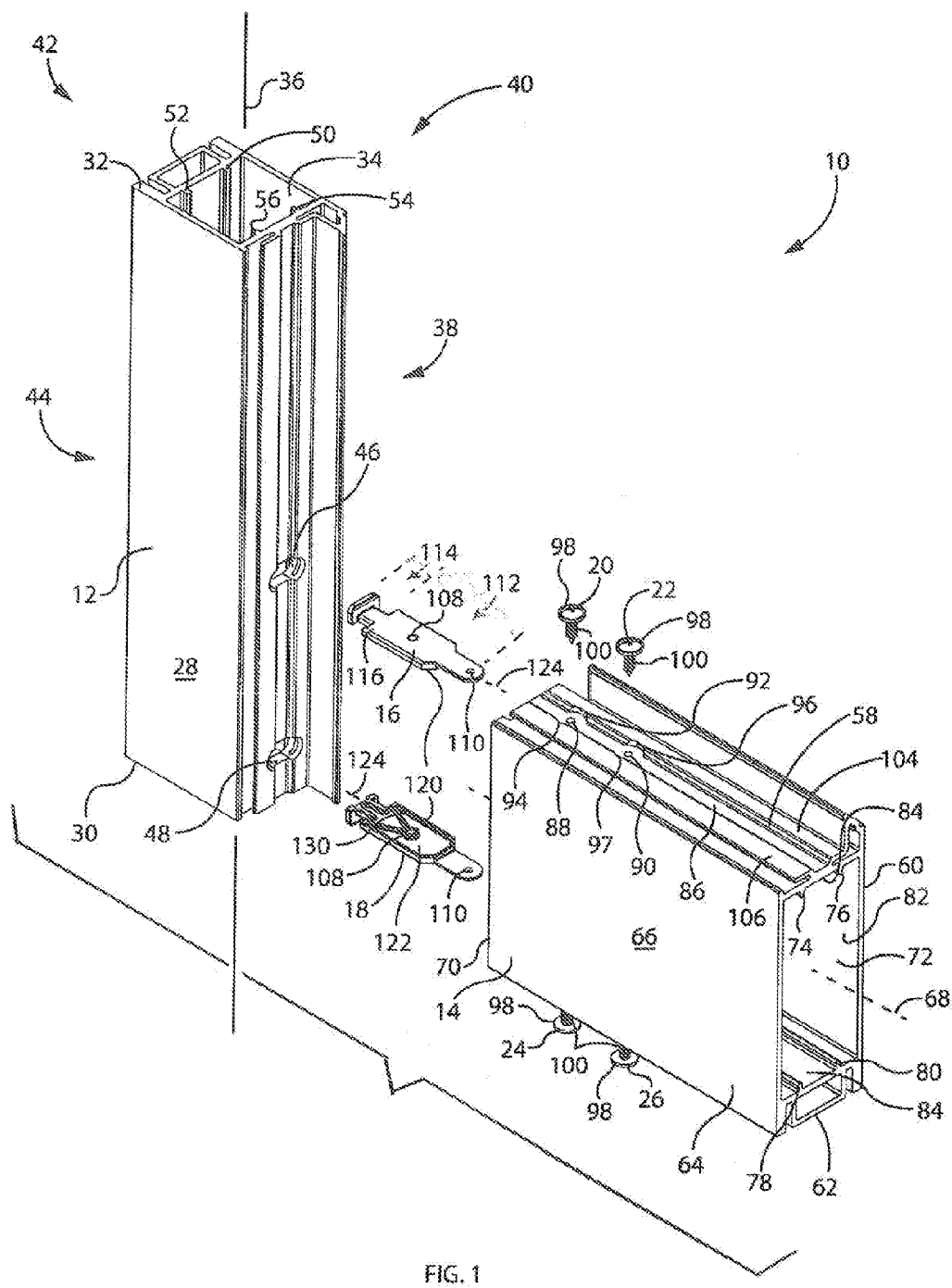
FIG. 1 depicts an exploded view of a connection assembly of a door or window assembly according to the present invention.

Referring now to the drawings, and initially to FIG. 1, an exploded view of a structural connection arrangement or frame assembly 10 according to the present invention is shown. Frame assembly 10 includes a first elongate member or rail 12 and a second elongate member or rail 14, a first connector, connection member, or rail clip 16 and a second connector, connection member, or rail clip 18, and one or more fasteners 20, 22, 24, 26 for connecting each of rail clips 16, 18 to rail 14. Although only one joint is shown, it is appreciated that a window frame, door frame, window sash or sash, frame, or mullion assembly having a desired shape and size can be formed from different numbers of elongate members that are connected to one another in accordance with the description provided herein. That is, it is appreciated that the present invention is usable for connecting or more frame, sash, rail, and/or mullion elongate members to one another and in a desired orientation to form different sized and shaped assemblies.

Regardless of the particular application of first and/or second rails 12, 14 forming rails, stiles, mullions, etc. of a frame assembly, first rail 12 is defined by an elongate body 28 that extends from a first end 30 to a second end 32. It is appreciated that rails 12, 14 could be provided in any number of shapes, lengths, and/or quantities. In a representative embodiment, a cavity 34 is defined by body 28 and extends along a portion or the entirety of a longitudinal length, indicated by axis 36, of rail 12. It is appreciated that body 28 of rail 12 can be formed of any number of suitable materials, such as metal, plastic and/or fiberglass, for example.

Rail 12 includes a first side surface 38, a second side surface 40, a third side surface 42, and a fourth side surface 44 that collectively define a circumferential exterior surface of rail 12. It is appreciated that surfaces 38, 40, 42, 44 may be shaped to cooperate with structures and/or environments positioned adjacent to the respective frame assembly, whether that be structural members such as lumber, siding, flashing, etc., light structures such as glass panes, and/or other rail members disposed along the length thereof. Surface 38 is constructed to cooperate with rail 14 and surface 42 is contoured to cooperate with adjacent features associated with the framing opening and/or other rail members. In a representative embodiment, surfaces 38, 42 are shaped to be oriented transverse to the plane associated with the overall frame assembly 10 whereas surfaces 40, 44 are generally parallel to the plane associated with the resultant frame assembly such that one surface 40, 44 faces atmosphere and the other surface 40, 44 faces into the enclosed space associated with the frame assembly.

It is further appreciated that surface 42 maybe contoured so as to have a generally mirror shape of surface 38 wherein rail 12 is intended to form an intermediary frame member of the overall frame assembly. That is, it is envisioned that surfaces 38 and 42 can each be configured to cooperate with a rail, such as rail 14, such that a rail 14 could extend from the opposite facing sides of rail 12 such that two of the rails are parallel to one another and the parallel rails are each perpendicular to the third rail. It is further envisioned that other relative rail orientations can be achieved to form any number of frame assembly configurations having any desired number of interconnected rails to form a frame assembly having a desired shape and size.

Still referring to FIG. 1, rail 12 includes a first opening 46 and a second opening 48 that are longitudinally spaced along axis 36 of rail 12. As explained further below, openings 46, 48 are sized, shaped, and positioned relative to rail 12 so as to cooperate with a respective rail clip 16, 18 for securing abutting rails to one another. Body 28 of rail 12 includes one or more ribs 50, 52, 54, 56 that extend inwardly toward cavity 34. As explained further below, ribs 50, 52, 54, 56 improve the structural strength of rail 12 and can be configured to cooperate with a respective rail clip 16, 18 to prevent twisting or racking of a resultant frame assembly.

In a similar manner, rail 14 includes a first surface 58, a second surface 60, a third surface 62, and a fourth surface 64 that each face outward relative to an exterior circumferential cross-section of rail 14. Rail 14 is formed by a body 66 that extends in a longitudinal direction, indicated by axis 68, associated with a longitudinal length of rail 14. An end 70 of rail 14 is shaped to cooperate with surface 38 of rail 12 so as to provide a contact engagement or interface between end 70 and surface 38 of rails 12, 14 when the intersecting rails 12, 14 are connected. Body 66 of rail 14 defines a cavity 72 that extends along a portion or the entirety of longitudinal length 68 and a number of ribs 74, 76, 78, 80 extend from an interior surface 82 of body 66 into cavity 72. Rail clips 16, 18 slidably cooperate with a space or channel 84 formed between adjacent ribs 74, 76 and 78, 80 proximate the end of the rail 12, 14 that is to be secured to an adjacent rail. As explained further below, the cooperation of ribs 74, 76 and 78, 80 with a respective rail clip 16, 18 improves the robust non-rotational and non-translational interaction between rail clips 16, 18 and rail 14.

Surface 58 of rail 14 includes a slot, groove or channel 86 having one or more openings 88, 90 associated therewith. Surface 58 can include one or more cutouts 92, 94, 96, 97 in communication with channel 86 and disposed on opposite lateral sides of openings 88, 90 relative to longitudinal axis 68. Fasteners 20, 22, 24, 26 each include a head portion 98 and a threaded stem portion 100. Cutouts 92, 94, 96, 97 are shaped to generally correspond to a diameter of head portion 98 of fasteners 20, 22 such that head portions 98 of fasteners 20, 22 can seat between wall portions 104, 106 of surface 58, which generally flank channel 86 when fasteners 20, 22 secure rail clip 16 to rail 14.

Each rail clip 16, 18 includes a first opening 108 and the second opening 110 that are each shaped to threadingly engage the threaded stem portion 100 of a respective fastener 20, 22, 24, 26. Each rail clip includes a first portion 112, which includes openings 108, 110, and a second portion 114 that extends beyond an end 116 of the first portion 112 of a respective rail clip 16, 18. As explained further below, first portion 112 of each rail clip 16, 18 is shaped to overlap and cooperate with rail 14 whereas second portion 114 of each rail clip 16, 18 is shaped to extend into and cooperate with an adjacent rail 12 such that rail clips 16, 18 traverse the interface between end 70 of rail 14 and surface 38 of rail 12 when rails 12, 14 are connected to one another.

Figure 2:
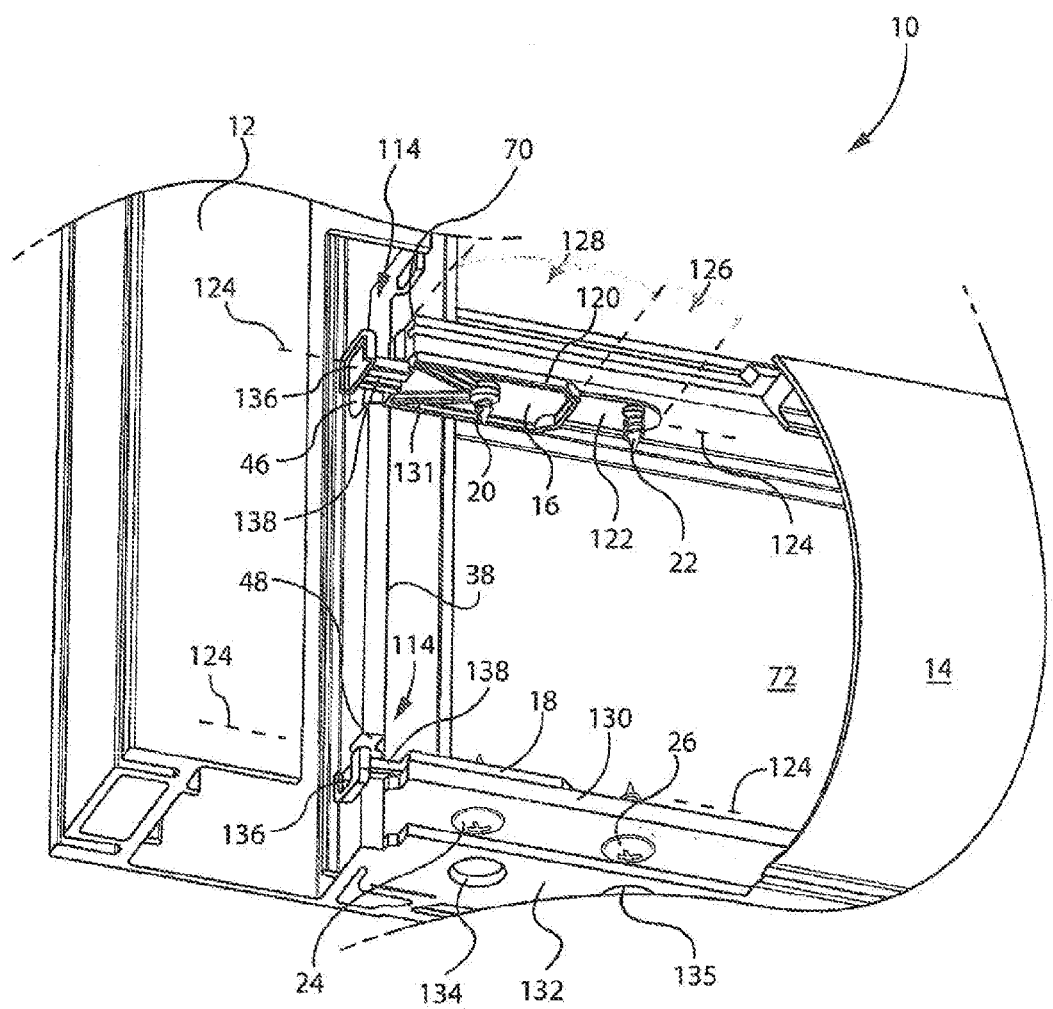
FIG. 2 depicts a partial perspective cross-sectional view of an assembled connection assembly shown in FIG. 1.

Referring to FIGS. 1 and 2, each rail clip 16, 18 can be configured so as to be used with fiberglass elements but understandably are not necessarily limited and may be used with elements of varying construction, and may be formed of other materials such as metals, plastics, and/or natural materials such as wood and the like. The rail clips 16, 18 may be constructed from plastic by injection molding operation or similar process known in the art. In the alternative, rail clips 16, 18 may be constructed from metal by die casting or using a die stamping process. The rail clips 16, 18 may be configured to be coupled to elongate rails or rail element by a coupling arrangement such as via use of one or more fasteners or alternative mechanical fastening such as via the use of rivets, adhesives or the like.

Each rail clip 16, 18 includes a rib 120 that extends from a body 122 of a respective rail clip 16, 18. Each rib 120 extends in a direction that crosses a longitudinal axis 124 of the corresponding rail clip 16, 18. First portion 112 of each rail clip 16, 18 includes a first section 126 and a second section 128 that extend along longitudinal axis 124. Rib 120 extends about a perimeter of second section 128 of each rail clip 16, 18. Rib 120 includes one or more interior ribs 130 that can extend between the perimeter of the respective rail clip 16, 18 and about opening 108. Ribs 120, 130 enhance the structural rigidity of second section 128 of each respective rail clip 16, 18. That portion of rib 130 that extends about opening 108 also provides a more robust structural interaction between the threaded stem portion 100 of the respective fastener 20, 24 and the body 122 of the respective rail clip 16, 18.

As shown in FIG. 2, rail clip 18 cooperates with an interior wall 131 of rail 14 and an exterior wall 132 of rail 14 extends over the interior wall 131. Exterior wall 132 includes one or more openings 134, 135 that are oriented to facilitate the passage of fasteners 24, 26 through exterior wall 132, into engagement with interior wall 131, and through interior wall 131 and into engagement with rail clip 18. The position of fasteners 24, 26 between walls 131, 132 of rail 14 renders fasteners 24, 26 hidden from view thereby improving the aesthetic appearance of the resultant frame assembly 10.

Figure 3:
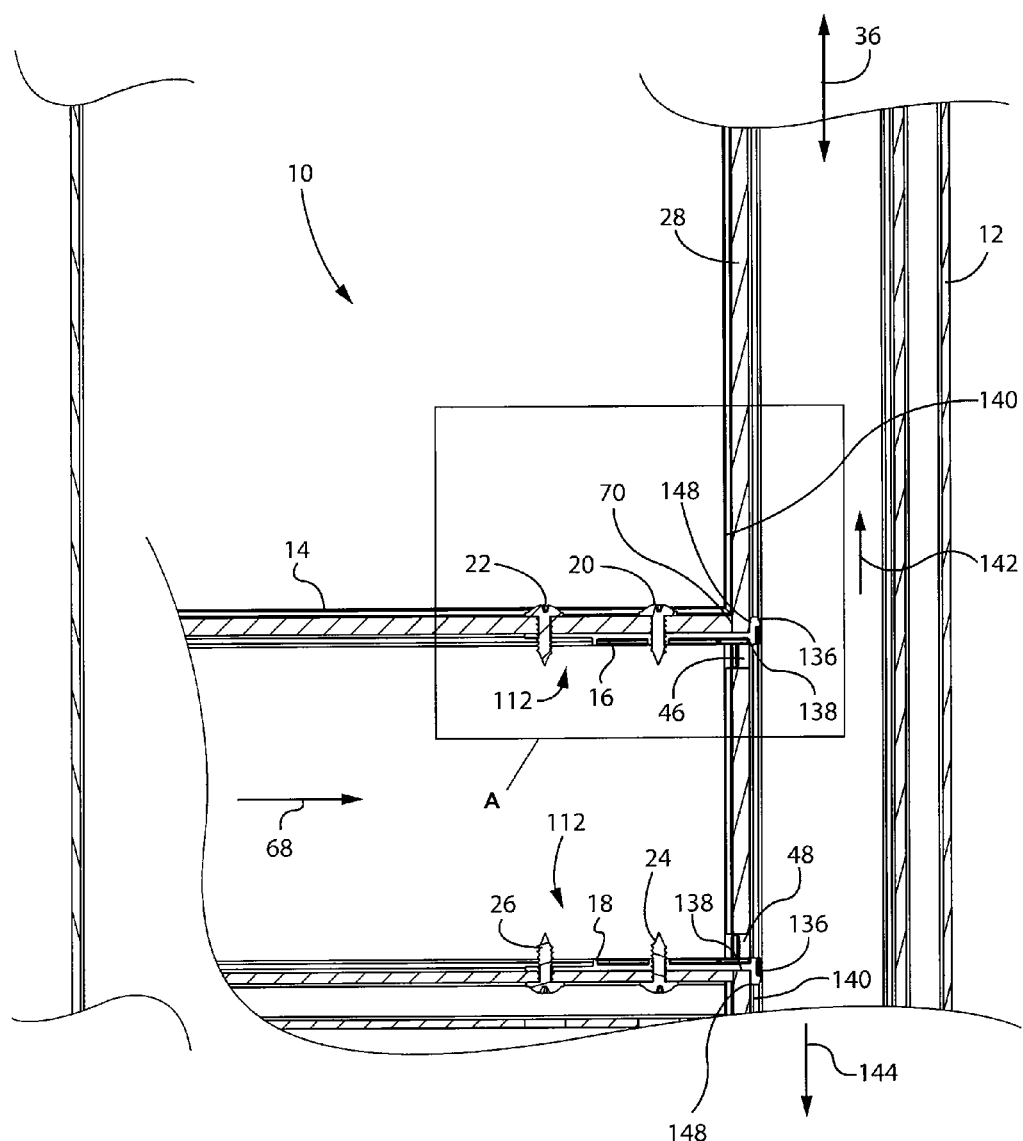
FIG. 3 depicts an elevational cross-sectional view of the assembled connection assembly shown in FIG. 2.
Figure 5:
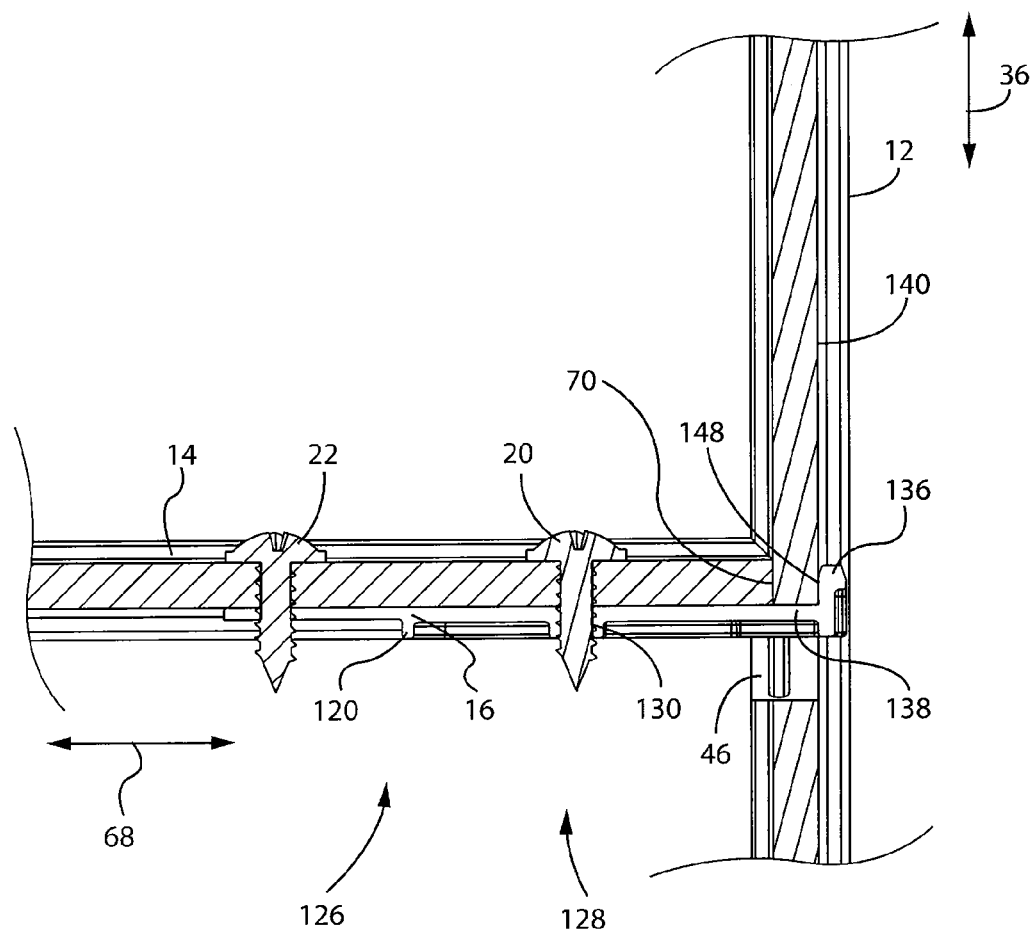
FIG. 5 depicts a partial section view taken along line A-A of FIG. 4 and shows one of the rail clips of the connection assembly shown in FIG. 2.

Still referring to FIG. 2, second portion 114 of each rail clip 16, 18 includes a ridge or tab 136 that is offset from end 116 of the first portion 112 of the respective rail clip 16, 18 by a stem 138. Tab 136 of each rail clip 16, 18 is shaped to pass through a respective opening 46, 48 of rail 12. Referring to FIGS. 3 and 5, when rails 12 and 14 are secured to one another, stem 138 extends through a respective opening 46, 48 formed in body 28 of rail 12 such that tab 136 can be positioned in the cavity 34 of rail 12. When fully assembled, tab 136 engages an interior surface 140 of body 28 of rail 12. Fasteners 20, 22 engage first portion 112 of rail clip 16 and fasteners 24, 26 engage first portion 112 of rail clip 18. Cooperation of fasteners 20, 22, 24, 26 with the respective rail clip 16, 18 draws tabs 136 in opposite directions 142, 144 relative to the respective opening 46, 48 such that a portion of body 28 of rail 12 is captured between a surface 148 of each tab 136 and end 70 of rail 14. As should be appreciated from FIG. 3, a largest distance between a periphery of openings 46, 48 is approximately the same as a largest distance between the stems 138 of adjacent rail clips 16, 18 but is less than the largest distance between tabs 136 of adjacent clips 16, 18 such that tabs 136 extend into rail 12 and overlap a portion of the body 28 of rail 12 that is adjacent the respective opening 46, 48. Representatively, tabs 136 extend in a plurality of radial directions from a distal end of stem 138. For example, tabs 136 may extend from stem 138 in a radial direction approximately 180 rotational degrees relative to the longitudinal axis of the respective rail clip 16, 18.

Still referring to FIGS. 3 and 5, during assembly or connection of rails 12, 14, rail clips 16, 18 can be loosely secured to rail 14 via partial engagement of one or both of fasteners 20, 22, 24, 26 with the respective rail clip 16, 18. Alternatively, each rail clip could be constructed to include a living hinge proximate the interface of first and second sections 126, 128 of each first portion 112 so that, if fastener 22 is driven into full engagement with rail clip 16, rail clip is allowed to bend or deflect so that tab 136 can be fully aligned with a corresponding opening 46 formed in rail 12.

Once rails 12, 14 have been positionally associated so that rail clips 16, 18 extend across the interface between rail 12 and rail 14, fully tightening fasteners 20, 22, 24, 26 translates tab 136 in respective directions 142, 144 associated with rail 12 and out of axial alignment with the corresponding opening 46, 48 so that the respective tab 136 overlaps a portion of rail 12 that surrounds the respective opening 46, 48. The interaction of tab 136 of rail clips 16, 18 with rail 12 prevents separation of rail 12 and rail 14 in a direction along the longitudinal axis 68 of rail 14, and the cooperation of stems 138 of rail clips 16, 18 and the perimeter of the respective opening 46, 48 prevents translation or movement of rail 14 relative to rail 12 in a direction aligned with the longitudinal axis 36 of rail 12. It is further appreciated that, although a parallel relationship is shown between the surface of tab 136 and surface 140, tab 136 could include an angled contour and/or include a wedge shaped surface which would act to advance or bias the end of rail 14 into tighter engagement against surface 38 of rail 12 as fasteners 20, 22, 24, 26 are advanced and tighten the respective rail clips 12, 14 against the interior surface 140 of rail 12. In addition, the stems 138 of rail clips 16, 18 and the side edges of the respective opening 46, 48 are sized so as to prevent translation or movement of rail 14 relative to rail 12 in a direction transverse to the longitudinal axis 36 of rail 12.

Figure 4:
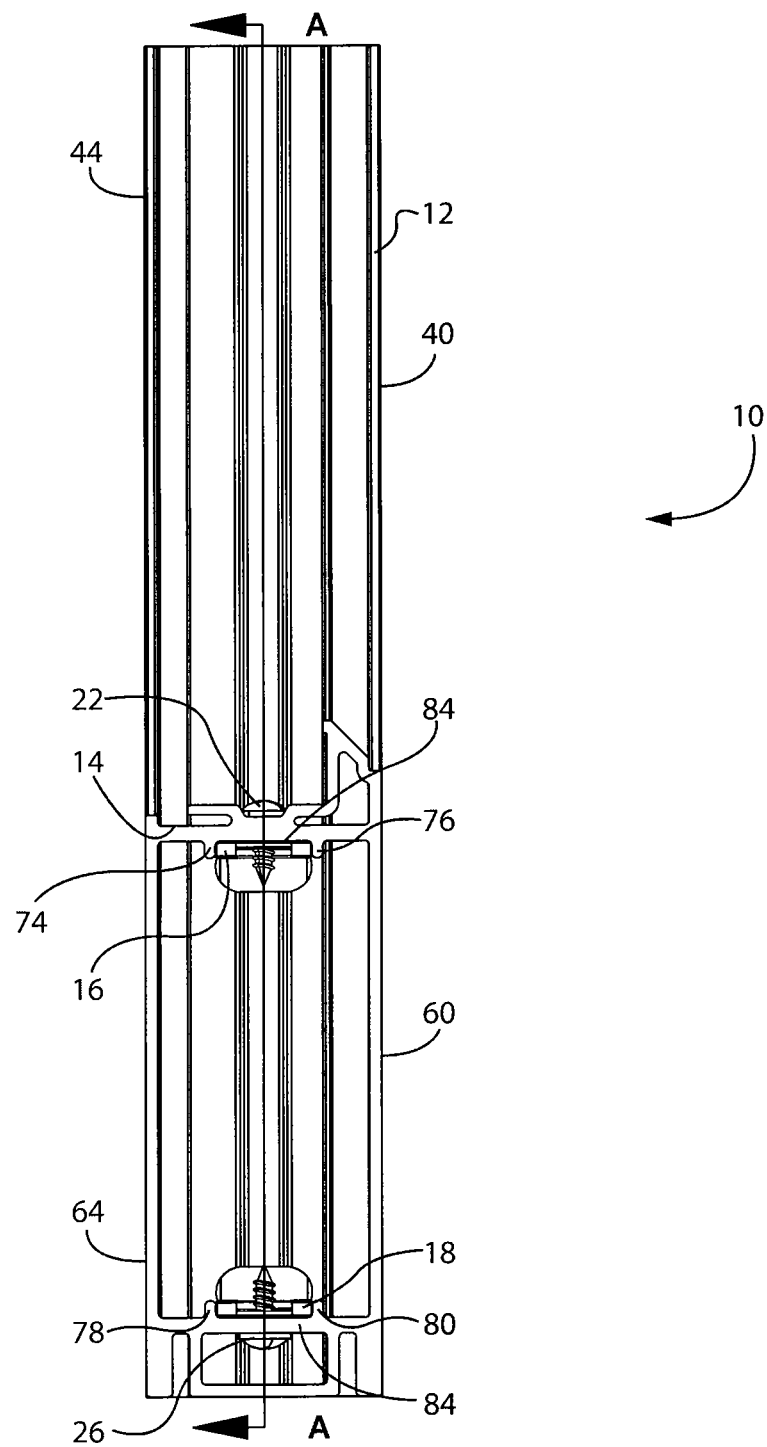
FIG. 4 depicts an elevational side view of the assembled connection assembly shown in FIG. 1.

Referring to FIG. 4, rail clips 16, 18 are shaped to slidably cooperate with the channel 84 defined by adjacent ribs 74, 76 and 78, 80 along the longitudinal length of the respective rail clip 16, 18. Slidable but snug cooperation of rail clips 16, 18 such that the rail clips 16, 18 are flanked by the adjacent ribs 74, 76 and 78, 80 provides a robust structural interaction that maintains the desired orthogonal alignment between surfaces 40, 44 of rail 12 with surfaces 60, 64 of rail 14, respectively. When multiple rails are connected to form a door frame, window frame, sash or mullion assembly, the cooperation of stems 138 with openings 46, 48, tabs 136 with interior surface 140 of rail 12, and the flanking cooperation of rail clips 12, 14, with a respective pair of ribs 74, 76, and 78, 80 of rail 14 provides a frame assembly that is structurally robust in the three orthogonal directions associated with axis 36, axis 68, and the axis normal to both axis 36 and 68.

Although the above description relates to a configuration in which rails 12, 14 are intended to have a perpendicular association, it is appreciated that the present invention is suitable to other configurations wherein not all, or perhaps any, of the respective elongate members are oriented orthogonally to one another. That is, it is appreciated that the present invention is suitable for joining together elongate members that are not oriented in a perpendicular relationship. Regardless of the relative orientation of the respective members, the connection methodology disclosed above is suitable for coupling of differently sized and shaped rails and upright elongate elements or members. That is, the rail clips 16, 18 enable an operator to join any size rail to any corresponding size upright element, e.g., stile, mullion, frame, etc. The rail clips 16, 18 of the present invention further enable the fixing of integral mullions to one another as well as fixing the mullions to the rails, stiles, or other frame members in the desired locations. In addition, rail clips 16, 18 are capable of joining patio door rails and stiles to one another. Further, rail clips 16, 18 of the present invention are easier and cheaper to manufacture than traditional connection solutions such as corner keys.

An example of a system and method for forming frame assemblies has been described, but those of skill in the art will be aware of many options and alternatives to the equipment, frame members, and method steps described can be used.

Various embodiments are described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

I claim:

1. A structural connection arrangement, comprising:
   a first member extending along a first longitudinal axis, wherein the first member defines an end;
   a second member extending along a second longitudinal axis, wherein the second member defines an abutment wall having an inner surface and an outer surface, wherein the abutment wall includes at least one opening extending between the inner and outer surfaces of the abutment wall and oriented in a transverse direction relative to the second longitudinal axis, wherein the end of the first member is positioned adjacent to and facing the outer surface of the abutment wall of the second member;
   one or more connection members carried by the first member for securing the first and second members together, each connection member comprising:
      a first member connection portion configured to be coupled to the first member and a second member connection portion that extends beyond the end of the first member;
      a tab formed on the second member connection portion of the connection member,
   wherein the tab extends in a direction that is transverse to the first longitudinal axis; and
   a coupling arrangement that is engageable with the first member and with each of the connection members, wherein the coupling arrangement is configured to selectively provide movement of the connection member in a direction that is transverse to the first longitudinal axis toward a surface of the first member to an engaged position;
   wherein when the end of the first member is positioned adjacent to and facing the outer surface of the abutment wall of the second member at a location adjacent the at least one opening of the second member, the tab extends into and through the at least one opening of the second member, and wherein movement of the connection member to the engaged position is operable to move the tab in a direction along the second longitudinal axis into engagement with the inner surface of the abutment wall of the second member adjacent the opening to prevent movement of the second member away from the first member along the first longitudinal axis.

2. The structural connection arrangement of claim 1 wherein the coupling arrangement comprises at least one fastener.

3. The structural connection arrangement of claim 2 wherein the at least one fastener comprises a first fastener and a second fastener that each engages the first member connection portion and are spaced from one another along the first longitudinal axis.

4. The structural connection arrangement of claim 2 wherein the first member includes a first cutout and a second cutout that are each shaped to cooperate with a head of each of the first and second fasteners.

5. The structural connection arrangement of claim 1 wherein the first member connection portion of each connection member defines an end, from which the second member connection portion extends, that has a transverse dimension greater than the opening of the second member.

6. The structural connection arrangement of claim 5 further comprising at least one rib formed on the first member connection portion of each connection member.

7. A structural frame assembly comprising:
   a first frame member extending along a first longitudinal axis and a second frame member extending along a second longitudinal axis, each frame member having a cavity, and wherein the first frame member defines an end and the second frame member defines an abutment wall defining an inner surface and an outer surface;
   a first connector and a second connector, wherein each connector includes a body that extends along a connector longitudinal axis;
   a tab located at an end defined by each connector and extending in a transverse direction from the connector body relative to the longitudinal axis of the connector body;
   spaced apart first and second openings formed in the abutment wall of the second frame member, wherein each opening extends between the inner and outer surfaces of the abutment wall;
   wherein when the end defined by the first frame member is positioned adjacent to and facing the outer surface of the abutment wall of the second frame member at a location between the first and second openings in the abutment wall of the second frame member, the first and second connectors are located adjacent a pair of surfaces defined by the first frame member and the tabs of both of the first connector and the second connector extend outwardly from the end of the first frame member and through the respective first and second openings in the second frame member and into the cavity of the second frame member; and
   further comprising a coupling arrangement engaged with the first frame member and each of the first and second connectors, wherein the coupling arrangement secures the body of each connector to the first frame member and also moves the tabs of the first and second connectors in a direction along the second longitudinal axis to position the tabs of the first and second connectors in alignment with the inner surface of the abutment wall of the second frame member adjacent the respective first and second openings, wherein the first frame member is secured to the second frame member and the first longitudinal axis of the first frame member extends in a transverse direction relative to the second longitudinal axis of the second frame member.

8. The structural frame assembly of claim 7 wherein the coupling arrangement comprises one or more fasteners that extend through each of the first connector and the second connector into engagement with the first frame member.

9. The structural frame assembly of claim 8 wherein the one or more fasteners comprise a pair of fasteners that extend through each of the first connector and the second connector into engagement with the first frame member such that the fasteners are offset from one another along the first longitudinal axis of the first frame member.

10. The structural frame assembly of claim 9 further comprising a reinforcing rib defined by the body of each of the first connector and the second connector.

11. The structural frame assembly of claim 7 wherein the tab of each connector has a generally semi-circular shape.

* * * * *